G. D. GRIFFICE.
PLANTER ATTACHMENT.
APPLICATION FILED DEC. 31, 1918.
1,328,375.
Patented Jan. 20, 1920.
2 SHEETS—SHEET 1.
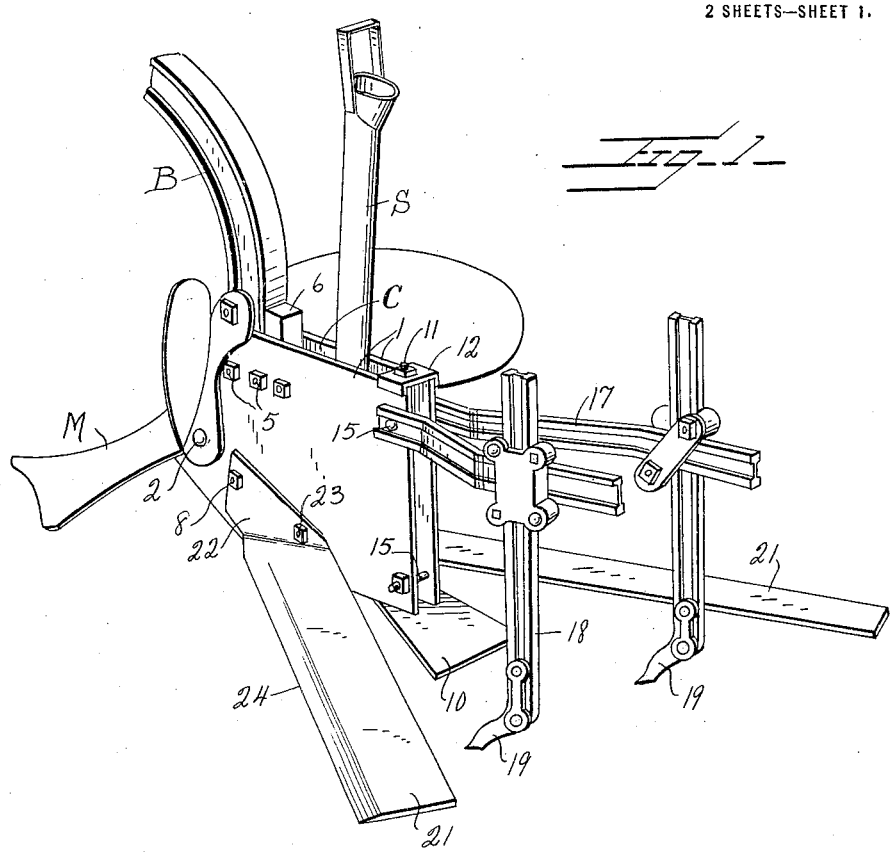
Inventor
G. D. Griffice
By Watson E. Coleman
Attorney G. D. GRIFFICE.
PLANTER ATTACHMENT.
APPLICATION FILED DEC. 31, 1918.
1,328,375.
Patented Jan. 20, 1920.
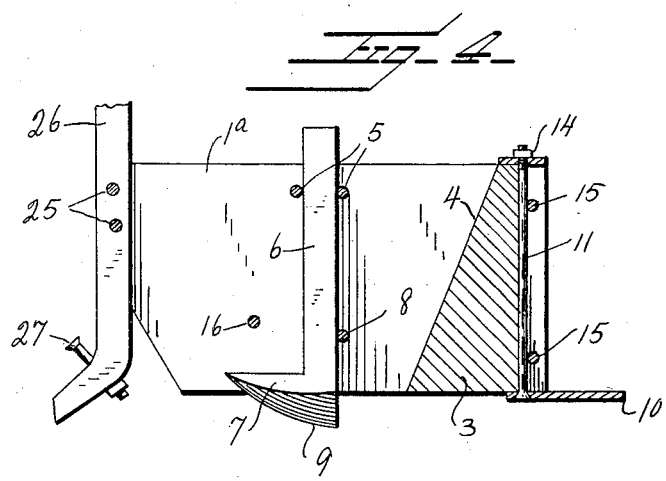
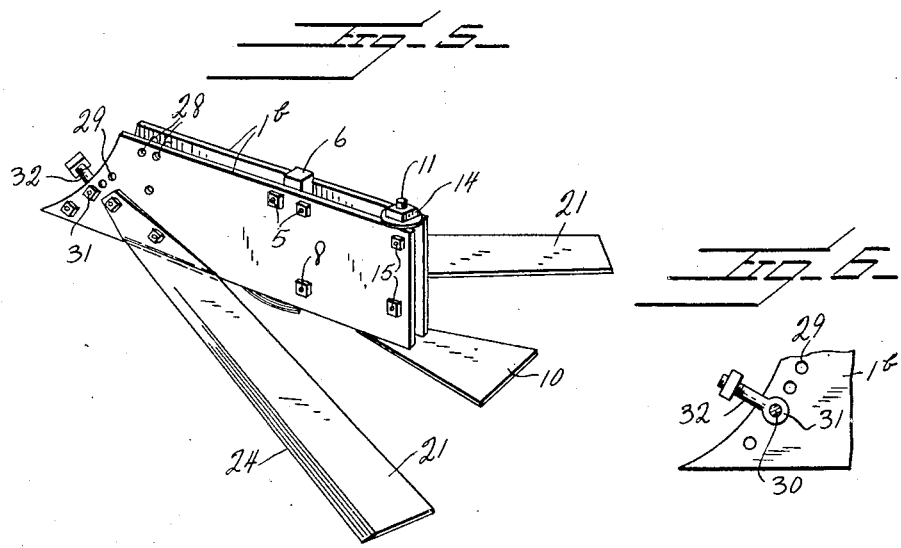
Inventor
G.D.Griffice
By Watson E. Coleman
Attorney

UNITED STATES PATENT OFFICE.

GEORGE D. GRIFFICE, OF BIG SPRING, TEXAS.

PLANTER ATTACHMENT.

1,328,375. Specification of Letters Patent. Patented Jan. 20, 1920.

Application filed December 31, 1918. Serial No. 269,039.

*To all whom it may concern:*

Be it known that I, GEORGE D. GRIFFICE, a citizen of the United States, residing at Big Spring, in the county of Howard and State of Texas, have invented certain new and useful Improvements in Planter Attachments, of which the following is a specification, reference being had to the accompanying drawings.

This invention relates to certain improvements in planter attachments, and it is an object of the invention to provide an attachment of this general character especially designed and adapted for use in connection with hard or dry soil, and which is provided with novel and improved means whereby a furrow or groove is cut or produced in the soil to receive the seed, together with means for closing said groove or furrow after the seed has been planted.

It is also an object of the invention to provide a novel and improved attachment of this general character adapted to be employed in connection with and positioned rearwardly of a buster or breaker plow, and which operates to produce a supplemental furrow or groove to receive the seed, and wherein said attachment is provided with a chamber to receive the seed, and from which the seed is delivered within the supplemental furrow or groove.

The invention consists in the details of construction and in the combination and arrangement of the several parts of my improved planter attachment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in perspective illustrating an attachment constructed in accordance with an embodiment of my invention, the coacting beam of a breaker or buster plow being shown in fragment, and a coacting seeder spout being shown in elevation, the hopper with which said spout coöperates being omitted;

Fig. 2 is a view partly in side elevation and partly in section of my improved attachment as disclosed in Fig. 1, the coacting seeder spout being shown in fragment;

Fig. 3 is a fragmentary view in perspective of the opening plow or member as herein embodied;

Fig. 4 is a view partly in side elevation and partly in section illustrating an attachment constructed in accordance with a further embodiment of my invention, the coacting sheth or beam of the plow structure being shown in fragment;

Fig. 5 is a view in perspective of a planter attachment constructed in accordance with a still further embodiment of my invention; and Fig. 6 is a fragmentary view partly in side elevation and partly in section illustrating in detail the means whereby the attachment as illustrated in Fig. 5 is engaged with the ground working member of a breaker or buster plow.

As is particularly illustrated in Figs. 1 to 3, B denotes the beam of a breaker or buster plow of an ordinary type, and which has secured to its lower end portion the ground working member M also of a conventional type.

My improved attachment as particularly disclosed in Figs. 1 and 2 comprises two transversely spaced plates 1 having their flat faces vertically disposed and which have their forward end portions secured, as at 2, to the lower portion of the beam B and extending rearwardly therefrom. Interposed between the rear portions of the plates 1 is a filler block 3 having its inner vertical edge face 4 arranged on a downward and inward incline. Intersecting the space between the plates 1 and supported thereby is a pair of bolts 5. The bolts 5 are longitudinally spaced and in substantially horizontal alinement, and are arranged at the upper portion of the plates 1 adjacent the forward ends thereof. Extending between the bolts 5 and positioned between the plates 1 is the shank 6 having arranged at its lower end the ground opening member 7. The lower end portion of the shank 6 has its rear face adapted for contact with a bolt 8 supported by the plates 1 and intersecting the space therebetween.

The bolts 5 frictionally engage the shank 6 so that the same may be held in desired vertical position relative to the plates 1 so that the ground working member 7 may be positioned a distance below the lower edges of the plates 1 as the occasions of practice may necessitate. It will also be self evident that the bolt 8 serves to hold the shank 6 against rearward swinging movement beyond substantially a vertical center.

The ground engaging member extends forwardly from the lower end of the shank 6 and has its lower face provided with a downwardly and rearwardly curved cutting edge 9, and which cutting edge is substantially V-shaped in cross section so that in operation the member 7 produces a correspondingly formed groove or furrow in the base portion of the trench or furrow cut by the member M. The lower portion of the block 3 is spaced a distance rearwardly from the lower end portion of the shank 6 and said shank 6 coacts with the inner edge face of the block 3 to produce a chamber C into which seed is delivered by the spout S. The spout S contacts with a suitable hopper, not shown, and which is preferably carried by the plow structure with which my improved attachment is employed. As is clearly illustrated in Fig. 2, the seed delivered within the compartment C is dropped into the supplemental furrow or groove cut by the member 7.

Underlying the rear portions of the plates 1 is the inner end portion of a flat presser foot 10 which also partially underlies the lower end of the block 3. The foot 10 is held in position through the medium of the vertically disposed bolt 11 directed upwardly between the rear portions of the plate 1 and disposed through a plate 12 resting upon the upper edges of the plates 1 at the rear thereof. The plate 12 also overlies the upper end of the block 3 and threaded upon the upper end portion of the bolt 11 is the clamping nut 14 coacting with the plate 12. The nut 14 operates to maintain the foot 10 in applied position through the medium of the bolt 11 and also operates to hold the block 3 in applied position through the medium of the foot 10 and the plate 12.

To further hold the plates 1 in assembled relation, I find it of advantage to provide at the rear portion of the said plates the vertically spaced bolts 15 and a bolt 16 coacting with said plates substantially midway thereof and adjacent the upper edges of the plates.

The upper bolt 15 also serves to hold to the plates 1 the rearwardly directed and transversely spaced short beams 17. Depending from the rear portion of each of the beams 17 is a sheth or standard 18, to the lower end portion of which is secured a covering blade or shovel 19.

My improved attachment as hereinbefore described is particularly adapted for use in connection with hard soil such as is generally found in Texas and the vicinity adjacent thereto. In the event that the soil should be sticky, I find it of particular advantage to provide the lower margin of each of the plates 1 rearwardly of and immediately adjacent the member 7 with the cut out portion or recess 20. With the provision of this cut out portion or recess 20 in each of the plates 1 it has been fully established in practice that the working operation of the member 7 is materially facilitated, and particularly when my improved attachment is employed in connection with black, sticky land.

It will also be understood that in operation, after the member M has produced a broad groove or furrow, the member 7 will operate to cut a supplemental furrow or groove in the central portion of the first or main furrow or trench, and that the seed will be dropped directly within said supplemental trench or furrow. As the device advances, the foot 10 operates to close the supplemental furrow or groove and substantially seal the seed therein before the covering blades or shovels throw the loose dirt over the track of the foot 10. This operation serves to prevent dislodgment of the seeds by high winds and also prevents the hot sun from drying down to the seed.

To the outer face of each of the plates 1 is secured a substantially flat blade 21, said blade 21 being disposed rearwardly and outwardly on a predetermined incline and having its inner or forward end provided with an upturned portion 22 overlying the outer face of the plate 1 and which is held thereto through the medium of the bolt 8 and a second bolt 23. The outer longitudinal margin of each of the blades 21 is provided with a cutting edge 24, so that each of said blades 21 may operate as a surface cultivator. Each of the blades 21 also serves to break the soil and results in the ground being flat broken.

The invention as illustrated in Fig. 4 is substantially the same as has heretofore been described except that each of the plates 1ª is adapted to have its forward portion secured at the upper margin thereof through the medium of the bolts 25 or the like to the upright or helve 26 of a planter of the Case type. 27 denotes a bolt whereby a breaker blade or shovel may be properly secured to the lower end portion of the upright or helve 26.

The form of my invention as illustrated in Figs. 5 and 6 is also substantially the same as has been described in Figs. 1 to 3 with the exception that a suitably carried beam or support is adapted to have an end portion extend between the forward end portions of the plates 1ᵇ and suitable anchored thereto as indicated by the openings 28. The forward portions of the plates 1ᵇ are also provided with the openings 29 and through an alined pair of such openings a bolt 30 is disposed. The bolt 30 is also adapted to be disposed through an eye 31 arranged at the end of a bolt 32. The bolt 32 serves as a medium whereby a breaker or buster blade or shovel may be supported directly by the plates 1ᵇ.

From the foregoing description, it is thought to be obvious that a planter attachment constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

What is claimed is—

1. In combination with a ground working member, an attachment arranged rearwardly thereof and including a member provided with a seed receiving chamber discharging at the lower portion of the member, a ground working member carried by said first named member and extending below said first named member, and a presser foot carried by the first named member rearwardly of the compartment.

2. In combination with a ground working member, an attachment arranged rearwardly thereof and including a member provided with a seed receiving chamber discharging at the lower portion of the chamber, and a ground working member carried by said first named member and extending below said first named member, said second ground engaging member being provided at its rear portion with an upwardly directed shank adjustably engaged with the first named member and constituting a wall of the seed-receiving chamber.

3. An attachment of the class described comprising a pair of spaced plates, a block interposed between the rear portions of the plates, a shank disposed between the plates inwardly of the block and adjustable in a direction longitudinally of the shank, the block and shank forming with the plates a passageway for seeds, and an earth working element carried by the shank.

4. An attachment of the class described comprising a pair of spaced plates, a block interposed between the rear portions of the plates, a shank disposed between the plates inwardly of the block and adjustable in a direction longitudinally of the shank, the space between the block and the shank serving as a seed receiving compartment, the inner face of the block being inclined downwardly and inwardly and an earth working element carried by the shank.

5. An attachment of the class described comprising a pair of transversely spaced plates, a ground engaging member carried thereby and extending therebelow, a block interposed between the plates rearwardly of the ground engaging member, a flat presser foot underlying the rear portions of the plates and the block, a second plate overlying the first named plates and the block, and clamping means coacting with the presser foot and the second named plate whereby the presser foot and the block are maintained in applied position.

6. An attachment of the class described comprising a pair of spaced plates, a block interposed between the rear portions of the plates, a shank disposed between the plates inwardly of the block, the block and shank forming with the plates a passageway for seeds, and an earth working element carried by the shank.

7. An attachment of the class described comprising a pair of spaced plates, a block interposed between the rear portions of the plates, and a shank disposed between the plates inwardly of the block, the block and shank forming with the plates a passageway for seeds, the lower end portion of the shank being provided with a forwardly directed ground engaging member.

8. In combination with a ground breaking member, a pair of spaced plates extending rearwardly from said member and provided with a seed passage, and a substantially flat blade secured to each of the plates at a point in close proximity to the ground breaking member, said blades diverging in a direction away from the ground breaking member.

9. An attachment of the class described including a member provided with seed-receiving chamber discharging at the lower portion of the member, a ground working member carried by said first-named member and extending therebelow, a pressed foot carried by the first named member rearwardly of the compartment, and substantially flat blades secured to the side faces of the first-named member and diverging rearwardly.

In testimony whereof I hereunto affix my signature in the presence of two witnesses.

GEORGE D. GRIFFICE.

Witnesses:
JOE E. SMITH,
JOE CAUGHEY.